(12) United States Patent
Johansson

(10) Patent No.: US 6,347,227 B1
(45) Date of Patent: Feb. 12, 2002

(54) METHOD AND APPARATUS OF DETERMINATING THE POSITION OF A MOBILE STATION

(75) Inventor: Jörgen Johansson, Karlskrong (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/141,261

(22) Filed: Aug. 27, 1998

(30) Foreign Application Priority Data

Aug. 28, 1997 (SE) .............................................. 9703104

(51) Int. Cl.[7] .................................................. H04Q 7/20
(52) U.S. Cl. ........................ 455/456; 455/432; 455/433
(58) Field of Search .................................. 455/433, 432, 455/456, 457, 439, 440, 404, 458; 342/357.13, 375.09, 357.1, 457; 701/211, 212, 213, 214, 207

(56) References Cited

U.S. PATENT DOCUMENTS

| 5,500,887 | A | | 3/1996 | Jeon et al. | |
|---|---|---|---|---|---|
| 5,561,840 | A | * | 10/1996 | Alvesalo et al. | 455/433 |
| 5,809,424 | A | * | 9/1998 | Eizenhoefer | 455/456 |
| 6,195,555 | B1 | * | 2/2001 | Dent | 455/456 |
| 6,198,933 | B1 | * | 3/2001 | Lundin | 455/456 |

FOREIGN PATENT DOCUMENTS

| DE | 4307123 A1 | 9/1994 |
|---|---|---|
| GB | 2 298 766 A | 9/1996 |
| WO | WO 95/34102 | 12/1995 |
| WO | WO 97/24010 | 7/1997 |

OTHER PUBLICATIONS

Translation of DE 4307123 A1 (document previously submitted Nov. 25, 1998).

* cited by examiner

Primary Examiner—Nay Maung
Assistant Examiner—Temica M. Davis
(74) Attorney, Agent, or Firm—Burns, Doane, Swecker & Mathis, L.L.P.

(57) ABSTRACT

The present invention relates generally to the problem of positioning of a mobile station ("MS") in a Public Land Mobile Network ("PLMN"), and more particularly to the problem of establishing the most accurate estimate of the last known position of the mobile station when the mobile station has switched off or has left the coverage area of the network. An application first sends a request to a Mobile Positioning Center, requesting position information for a particular subscriber. The MPC contacts the preferred Positioning Procedure, e.g. GPS, to obtain the positioning information. If this information is not available then the MPC contacts the HLR to get the last known positioning data. The HLR will try to retrieve the last known positioning data from the VLR and forward it to the MPC. If this is not available then the last known position stored in the HLR is forwarded to the MPC.

20 Claims, 3 Drawing Sheets

METHOD AND APPARATUS OF DETERMINATING THE POSITION OF A MOBILE STATION

FIELD OF THE INVENTION

The present invention relates generally to the problem of positioning of a mobile station ("MS") in a Public Land Mobile Network ("PLMN"), and more particularly to the problem of establishing the most accurate estimate of the last known position of the mobile station when the mobile station has switched off or has left the coverage area of the network.

RELATED ART

There are currently developing various commercial and regulatory needs to be able to use the Public Land Mobile Network ("PLMN") to geographically locate Mobile Stations ("MS"). An example of a PLMN is the GSM ("Global System for Mobile communications") system. A simplified schematic of a GSM system is shown in FIG. 1a. There is first a mobile station 110 which is usually the only equipment the subscriber sees from the whole system. The subscribers telephone, or terminal, connects over a radio interface to Base Station Sub-System ("BSS") 120. Roughly speaking, the Base Station Sub-System 120 groups together the infrastructure machines which are specific to the radio cellular aspects of GSM.

The BSS 120 is in direct contact with mobile stations through the radio interface. On the other side, the BSS 120 is in contact with the switches of the Switching System ("SS") 130. The role of the BSS 120 can be summarised as to connect the mobile station 110 and the Switching System 130, and hence the mobile station's user with other telecommunications users. The BSS 120 has to be controlled and is thus also in contact with the Operation Sub-System ("OSS") 140.

The Switching Sub-system 130 includes the main switching functions of GSM, as well as the databases need for subscriber data and mobility management. The main role of the Switching Sub-system is to manage the communications between the GSM users and other telecommunications network users. These other networks can include other PLMNs 151, the PSTN ("Public Switched Telephone Network") 152, CSPDN ("Circuit Switched Public Data Network") 153, PSPDN ("Packet Switched Public Data Network") 154, and ISDN ("Integrated Services Digital Network") 155.

Within the SS, the basic switching function is performed by the Mobile Services Switching Centre ("MSC") 131, whose main function is to co-ordinate the setting-up of calls to and from GSM users. The MSC 131 has interfaces with the BSS 120 on one side and with the external networks 150 on the other side. However, the direct connections between the external networks 150 and a GSM system are routed through a Gateway-MSC ("GMSC"), not shown here. All incoming calls for a GSM/PLMN network will be routed to one or more GMSCs which work as an incoming transit exchange for the GSM/PLMN. Besides MSCs 131, the Switching Sub-system 130 includes databases. Subscriber information relevant to the provision of telecommunications services is held on the infrastructure side in the Home Location Register ("HLR") 132, independently of the actual location of the subscriber. The HLR 132 also includes some information related to the current location of the subscriber. Every telecommunications system includes a database containing a variety of information concerning each subscriber, such as the subscription limitations, the services subscribed to, charging information, etc. In a fixed network, each subscriber is connected to one local switch, for a long time. Every call involving this subscriber goes through this switch. This is then the natural place to store the subscriber related information. In a system dealing with moving subscribers, there is no such natural place for storage. However, two kinds of data to be stored (location information and subscriber data) call for a common storage solution. This is the choice made in GSM, and the HLR 132 is the database for both sets of information.

If location information is needed only for the establishment of mobile terminating calls, the rest of the information is needed at various moments during any call. Basically, it is the visited Mobile Switching Centre 131, the one in charge of a mobile subscriber engaged in a call, which needs these pieces of information. This would result in a substantial signalling load if the MSC 131 had to interrogate the HLR each time it needs some piece of information.

To avoid this signalling load, the data record of a subscriber is copied into a database close to the MSC 131 while this subscriber is registered in a location area ("LA") controlled by the MSC 131. This database is the Visitor Location Register ("VLR") 133. The information regarding those subscribers which are registered under an MSC 131 connected to the VLR 133 is stored in the VLR 133, but only temporarily.

This introduces new functions. The subscriber information has to be copied when the subscriber enters a new MSC/VLR area. Conversely, the corresponding record has to be erased in the previous MSC/VLR area in which the subscriber was registered. This updating of the databases is done when certain events occur. These events include call set-up, handovers, call complete, IMSI (International Mobile Subscriber Identity) attach (i.e. when the mobile station switches on), IMSI detach (i.e. when the mobile station switches off) and location updates.

As mentioned above, there is increasing demand for the development of PLMN-based positioning. PLMN-based positioning can be considered to consist of four parts: a Positioning Procedure, a positioning gateway, applications, and signalling mechanisms.

The first of these four parts is a Positioning Procedure. This is a mechanism which is used by the network, e.g. GSM, to find out and report relative, or in some cases absolute, data about the location of the Mobile Station. Different Positioning Procedures can exist in the network simultaneously. These different Positioning Procedures can each have their own technical solutions and degrees of accuracy. The degrees of accuracy can range from the whole Service Area of the PLMN down to below 100 meters. However, in general, the higher the degree of accuracy, the higher the cost to the network in terms of signalling capacity and load.

One example of such a Positioning Procedure is GPS, Global Positioning System. GPS is satellite based system wherein a mobile station must be equipped with a GPS terminal. The GPS terminal can determine its position through reception of signals from at least three satellites. The position of the mobile station can then be acquired by the application, for example, polling the GPS terminal, after which the position information is sent over the network to the application.

Another possible Positioning Procedure is for the PLMN to measure the wave propagation time for the signal from the mobile station to a base station. The propagation time then corresponds to the position of the mobile station. The position of the MS can then be determined with certainty by repeating these measurements from two more base stations. It is also known to determine the mobile stations position by having the mobile station perform measurements on the signals from three base stations instead.

The second part of PLMN-based positioning is a positioning gateway. In the present patent application this will be referred to as a Mobile Positioning Centre ("MPC") 170. The Mobile Positioning Centre uses the data from the Positioning Procedure, e.g. GPS, to calculate the absolute position of the Mobile Station and distribute the position information to the applications, discussed below. The MPC 170 is connected to the PLMN via the Gateway Mobile services Switching Centre ("GMSC"). An example of a possible system using a Mobile Positioning Centre 170 is shown in FIG. 1b.

The third part of PLMN-based positioning consists of the applications that are the users of the positioning information retrieved from the network. The applications send the request for positioning information to the Mobile Positioning Centre 170, which retrieves the information from the network in a method according to the present invention and then forwards this positioning information onto the application. Examples of applications can include: fleet management, emergency services such as ambulance, and location dependent services like the nearest fuel facility or perhaps stolen vehicle recovery, etc.

The fourth, and final, part of a PLMN-based positioning system are the signalling mechanisms of the network. These are used for transferring the positioning data between the various elements used for determining the positioning of a mobile station.

Positioning systems based on the infrastructure and radio interface in a Public Land Mobile Network are not yet on the market. The only location information available in the system today when the mobile station is in "idle mode" is not very accurate. Idle mode is the mode of the mobile station when it merely listens to broadcast channels without having a channel of its own. It contrasts with "dedicated mode" where a bi-directional channel is allocated to the mobile station for its communication needs, allowing it to exchange point-to-point information with the infrastructure in both directions.

The best known area in GSM today when the MS is in idle mode is the Location Area ("LA"), which could be more than 100 kilometres wide. In future positioning systems there will be several ways to discover the location of a Mobile Station by using different Positioning Procedures.

The Positioning Procedure could be terminal-based or network-based. In a terminal-based solution it is the mobile stations that find out and report relative positioning data to the Mobile Positioning Centre for calculation of the absolute position. In a network-based solution it is the Base Station System 110 that reports the relative data to the Mobile Positioning Centre 170. A Positioning Procedure could also be a combination of both a terminal-based and a network-based procedure. Other Positioning Procedures could consist of external positioning equipment connected to the Mobile Station, e.g. GPS.

A problem that exists with these Positioning Procedures is based on the need to be able to locate the MS with an accuracy good enough for the applications. This need requires the network to be able to establish contact with the Mobile Station. This means that the Mobile Station must be switched on and within the coverage area of the network.

However a problem occurs when the Mobile Station is switched off or has left the coverage area of the network. It is then impossible to get accurate information about where and when the last known position of the Mobile Station was. However, in these circumstances the best information available in GSM, for example, is the Location Area. This accuracy is not good enough for most of the applications and there is no mechanism to guarantee that the information is available in the system when desired by the application.

SUMMARY OF THE INVENTION

The solution to the above described problem is to update the subscriber databases available in the system on a regular basis with accurate positioning data. The data can then be used to obtain the last known location of the Mobile Station when it can't be reached. What positioning data that is to be stored is a question of implementation. This could be, for example, the cell identification, or longitude and latitude as is used in GPS. However, since data is to be stored for all Mobile Stations moving around in the network, it is important to use a system friendly implementation that doesn't cause too much extra load which steals capacity in the network, but which still gives an accuracy that is good enough for the applications.

In the preferred embodiment of the present invention as implemented in GSM, there are two subscriber databases that will be updated. These are the Visitor Location Register 133 and the Home Location Register 132. The Visitor Location Register 133 is used for temporary storage while the Home Location Register 132 is used for permanent storage.

The Visitor Location Register 133 is updated when certain events occur that make the position information available to the system. Since the VLR 133 is only used for temporary storage of subscriber data, the positioning information must be transferred to the HLR 132 for permanent storage when the subscriber record in the VLR 133 is to be deleted for some reason.

An application first sends a request to the Mobile Positioning Centre, requesting position information for a particular subscriber. The MPC contacts the preferred Positioning Procedure to obtain the positioning information. If this information is not available then the MPC contacts the HLR to get the last known positioning data. The HLR will try to retrieve the last known positioning data from the VLR and forward it to the MPC. If this is not available then the last known position stored in the HLR is forwarded to the MPC.

The result of the present invention is that it makes it possible to obtain the last known location of a mobile station with good accuracy without stealing air interface or when the mobile station can't be reached by the normal Positioning Procedures. This increases the value of positioning for many applications.

It also makes it possible for the PLMN operator to offer "old" positioning data at a lower price since the cost of obtaining the position is lower when compared to other "real-time" Positioning Procedures, since no contact needs to be established with the mobile station.

Another benefit of the present invention is that the saved data can improve paging of mobile stations since the network can start paging in a specific cell instead of a whole Location Area. This will, of course, decrease the signalling in the network in most cases.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1A:
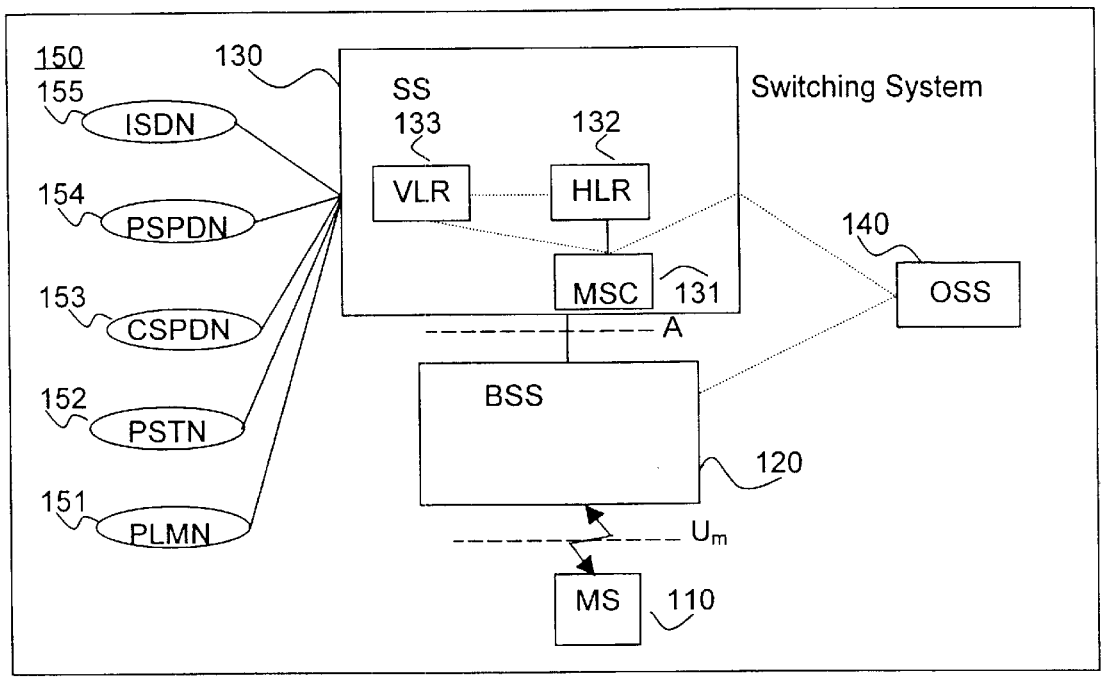
FIG. 1a is a drawing of a GSM cellular mobile communications network.
Figure 1B:
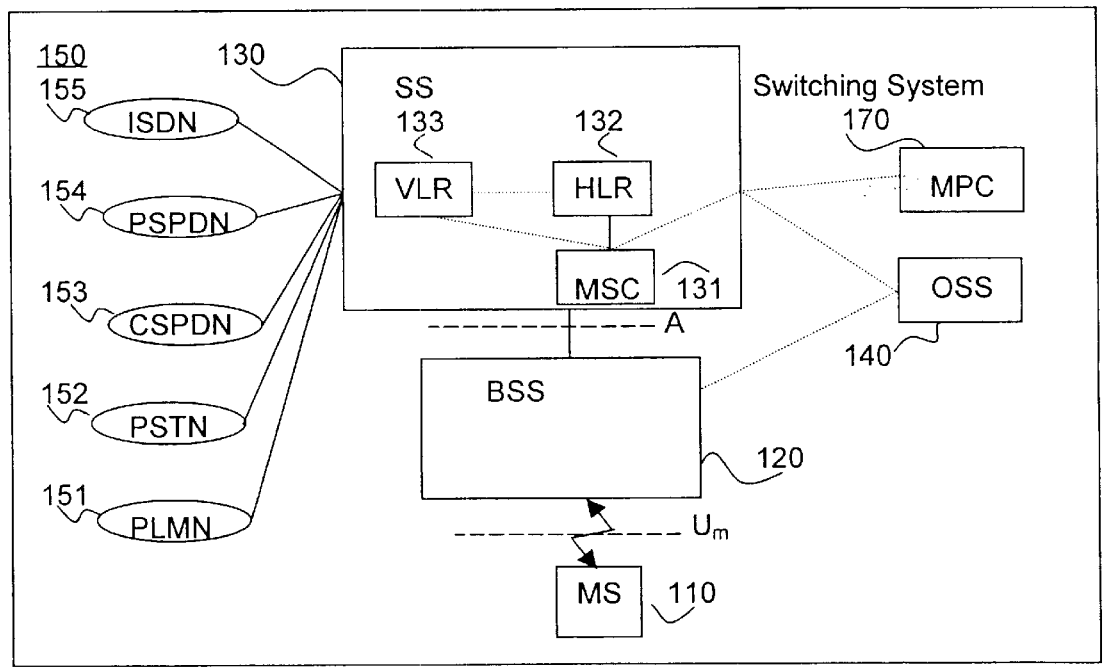
FIG. 1b is a drawing of a GSM cellular mobile communications network having a Mobile Positioning Centre.

The method of the present invention will be discussed in relation to how it can be implemented in a GSM system. It can be appreciated, though, that the present invention is also applicable to other mobile systems such as NMT, AMPS, etc. All mobile systems contain some sort of database where subscriber information is stored, including information regarding the location of each subscriber. As has been discussed above, in GSM this database function is divided between the Visitor Location Register, where position information is stored only temporarily, and the Home Location Register, where information is stored on a more long-term basis. This has been done to conserve signalling resources. However, in some mobile systems a single database could perform similar functions to both the VLR and the HLR, depending on the implementation of the particular system.

The present invention uses accurate positioning data to regularly update the subscriber databases in the system. For GSM, the best, implementation would be to use the Cell Global Identity ("CGI"), since this information is normally updated and used by the system for other purposes than positioning, e.g. routing, etc. In this way no extra positionings are initiated and performed to solve the problem. Thus, there is no substantial extra load on the system due to positioning.

The CGI can be translated to an area corresponding to the coverage area of a specific cell. This provides an accuracy ranging from 100 meters to 35 kilometres RMS(i.e. the cell sizes in GSM). This accuracy can be worse, for example, if base stations with extended range are used. On the other hand, the CGI can also be implemented with the Timing Advance ("TA"), when available, which increases the accuracy since the TA could be translated into a distance to the base station. Because of delays in propagation times for the signals from various mobile stations increase as they move farther away from a base station, the risk increases that there will be overlap of their signals. The only solution is for the mobile station to advance its signal emission relative to its reception time, thereby compensating for the to and from propagation delay. This value is called the timing advance.

Although the main aspect of the present invention involves providing position information to various applications, it is necessary for the particular database or databases which store the position information to be updated. In GSM, of course, these are the Visitor Location Register ("VLR"), which is used for temporary storage, and the Home Location Register ("HLR"), which is used for permanent storage. First, the positioning information, e.g. CGI, is stored in the VLR when certain events occur that make the information available in the system. If, for example, TA is used, it will also be sent for storage with the CGI. In addition to these, a time stamp will also be sent to the VLR which will be stored to show the date and time when the information was retrieved.

Figure 2:
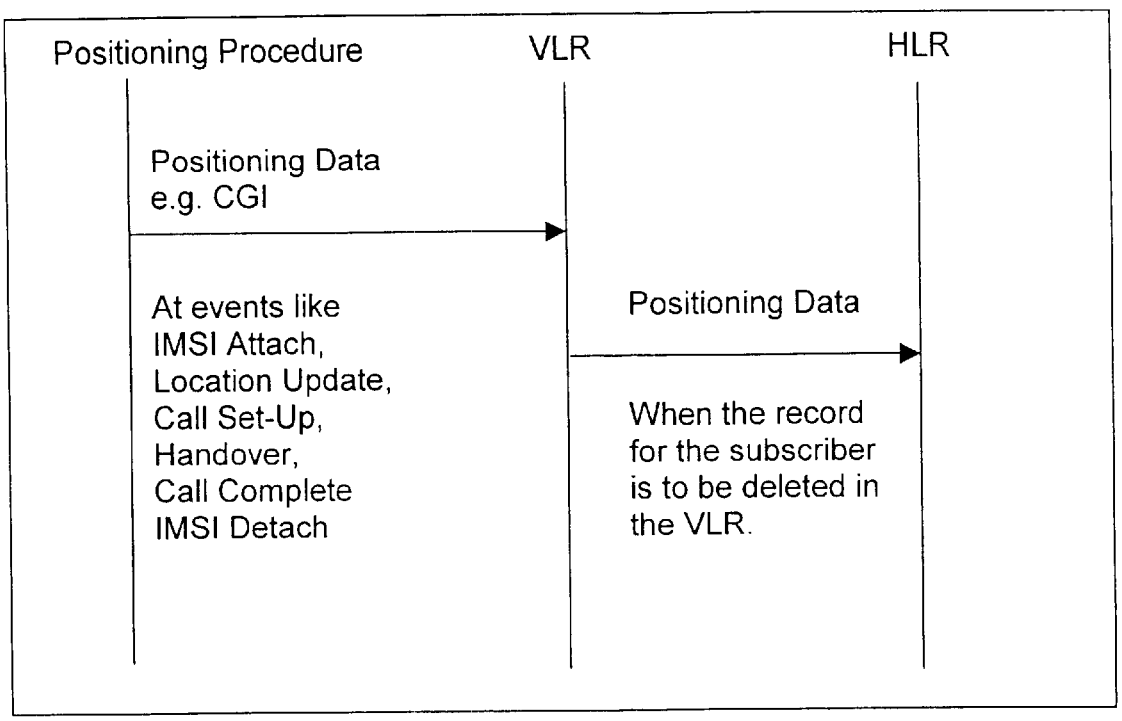
FIG. 2 is a diagram illustrating the timing of the updating of the VLR and HLR.

This information, e.g. CGI, TA, and time stamp, will be stored in the VLR when certain events occur. These events include call set-up, handovers, call complete, IMSI (International Mobile Subscriber Identity) attach (i.e. when the mobile station switches on), IMSI detach (i.e. when the mobile station switches off) and location updates. See FIG. 2.

Since the VLR is only used for temporary storage of subscriber data, the positioning information is needed to be transferred to the HLR for permanent storage when the subscriber record in the VLR is to be deleted for some reason. Also see FIG. 2.

Certain changes will need to be made in the GSM system to implement the present invention. A new data field in the VLR and the HLR will need to be created to store the position information (e.g. CGI) and the time stamp. In addition, other fields can be created to store e.g. the timing advance. In addition, the system must be changed so that the positioning data is stored at relevant events. See FIG. 2. Also, signalling protocols will need to be changed to support the transfer of the positioning data between the different network elements. The system will also need to be changed so that the HLR is updated when the VLR is deleted for some reason. See FIG. 2.

In addition to the above changes, a Mobile Positioning Centre will have to be implemented. This will likely be an external node dedicated to handle positioning. However, methods of interrogating the HLR by the MPC will need to be developed, in addition to methods of communicating between the MPC and the various external applications.

The procedure in the previous paragraphs makes sure that no unnecessary signalling is performed in the network due to positioning. The invention could also be used as a Positioning Procedure when the application is satisfied with the poor accuracy given. It is probably cheaper to present "old" positioning data than to measure the position in real time.

When an application, e.g. an emergency ambulance service, asks for positioning information for an MS that can't be reached by the ordinary Positioning Procedure, e.g. GPS, the HLR checks to see if it is possible to get information from the current, if any, VLR about the last known position. If that doesn't succeed, the HLR sends back its last stored information to the application via the positioning gateway. The application can then act on and use that information in the best way due to the available time stamp.

Figure 3:
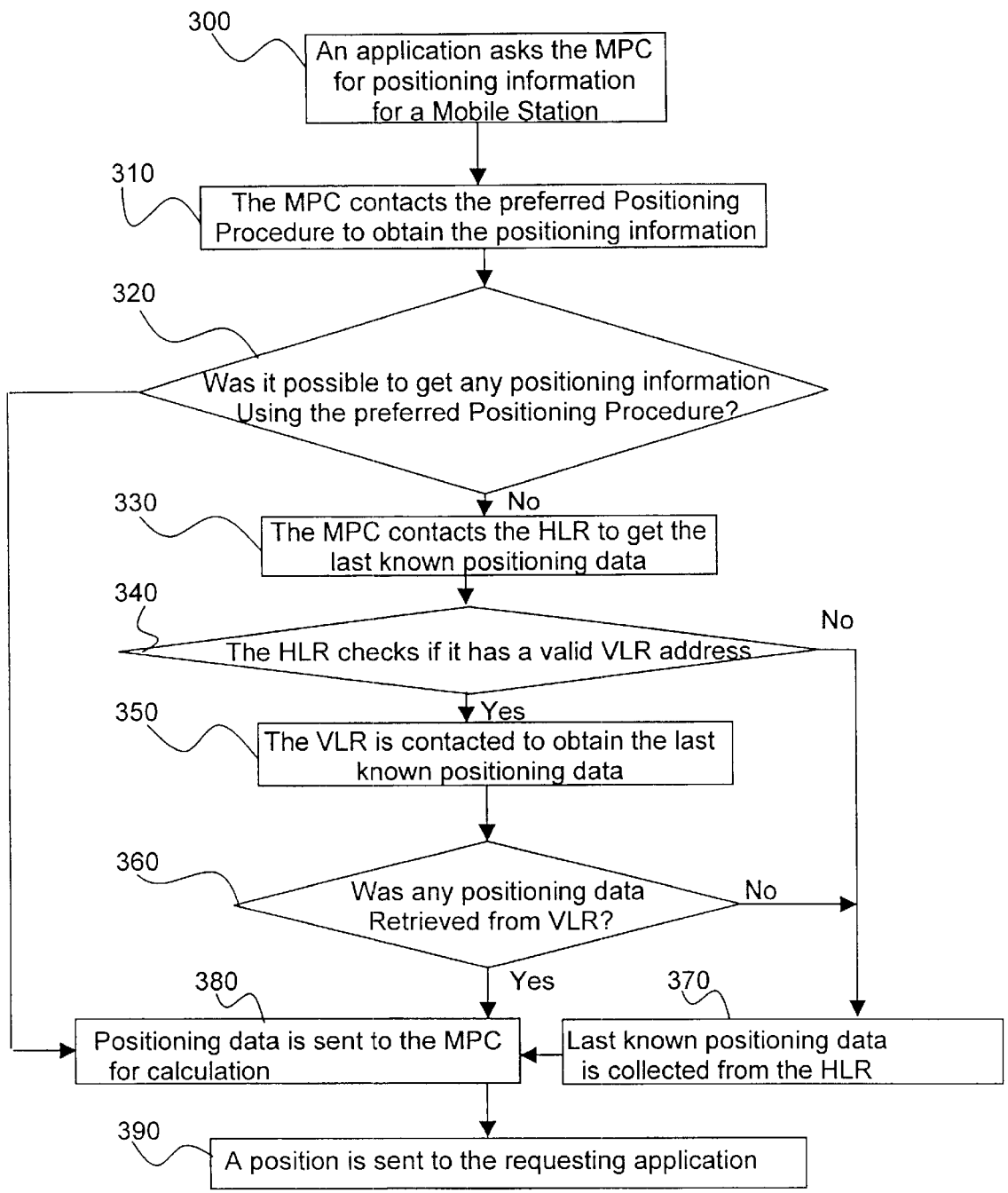
FIG. 3 is a flowchart illustrating the method according to the present invention.

FIG. 3 illustrates this procedure in more detail. The procedure begins when the application program asks the Mobile Positioning Centre ("MPC") for positioning information for a particular MS 300. The MPC then contacts the preferred Positioning Procedure to obtain the positioning information 310.

The MPC then checks to see if it was possible to get any positioning information using the preferred Positioning Procedure 320. If the answer is Yes, then the retrieved Positioning data is sent to the MPC for calculation 380.

If the answer is No, then the MPC contacts the HLR to get the last known positioning data 330. The HLR first checks to see if it has a valid VLR address 340. If the answer is No, then the last known positioning data is collected from the HLR 370 and this positioning data is sent to the MPC for calculation 380.

If the answer is Yes, then the VLR is contacted to obtain the last known positioning data 350. Then check to see if any positioning data can be retrieved from the VLR 360. If it is, then the positioning data is sent to the MPC for calculation 380. If it is not, then the last known positioning data is collected from the HLR 370 which is then sent to the MPC for calculation 380.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method of determining the position of a mobile station in a mobile radio system for use in an application, said method comprising the steps of:

performing an investigation as to whether a preferred positioning procedure can be obtained;

if said preferred positioning procedure cannot be obtained, then retrieving a first kind of location information stored in a database containing position information about said mobile station;

if said first kind of location information is unavailable, then retrieving a second kind of location information stored in said database and sending said second kind of location information to said application.

2. The method of claim 1 further comprising the step of storing said position information about the mobile station in said database, before said sending and retrieving steps.

3. The method of claim 2, wherein said step of retrieving said first kind of location information further includes the steps of:

a Mobile Positioning Center first contacting a Home Location Register with a Visitor Location Register address for said mobile station;

if said address is invalid then retrieve said last known position data in said Home Location Register; and if said address is valid then retrieve said last known position data in said Visitor Location Register.

4. The method of claim 3, further comprising the step of storing said first kind of location data in the Visitor Location Register when certain events occur which make said data available in the system.

5. The method of claim 4, wherein:

said event is a Location Update.

6. The method of claim 4, wherein:

said event is a Call Set-Up.

7. The method of claim 4, wherein:

said event is a Handover.

8. The method of claim 4, wherein:

said event is a Call Complete.

9. The method of claim 4, wherein:

said event is an IMSI attach.

10. The method of claim 4, wherein:

said event is an IMSI detach.

11. The method of claim 2, further comprising the step of transferring said first location information in said Visitor Location Register to said Home Location Register for permanent storage when said subscriber record in said Visitor Location Register is to be deleted.

12. The method of claim 1, wherein:

said positioning information is the Cell Global Identity.

13. The method of claim 1, wherein:

said positioning information is the longitude and latitude of said mobile station obtained from a GPS system.

14. The method of claim 1, wherein:

said positioning information is the location of said mobile station obtained from triangulating radio signals from said mobile station to radio base stations in said mobile radio system.

15. The method of claim 1, wherein: said positioning information includes a time stamp recording the time and date when the information is retrieved.

16. An apparatus for determining the position of a mobile station in a mobile radio system for use in an application, said apparatus comprising:

means for performing an investigation as to whether a positioning procedure can be obtained;

a means for retrieving a first kind of location information stored in a database containing position information about said mobile station;

a means for sending said first kind of location information to said application; and a means for retrieving a second kind of location information stored in said database and sending said second kind of location information to said application.

17. The apparatus of claim 16, further comprising:

a means for storing said position information about the mobile station in said database.

18. The apparatus of claim 17, wherein:

said mobile radio system is a GSM system having a Visitor Location Register database and a Home Location Register database; and wherein said first kind of location information is the last known position data of said mobile station stored in the Visitor Location Register and said second kind of Location information is the last known position of said mobile station stored in the Home Location Register.

19. The apparatus of claim 18, further comprising:

a means for retrieving said last known position data in said Home Location Register; and means for retrieving said last known position data in said Visitor Location Register.

20. The apparatus of claim 19, further comprising:

a means for storing said first kind of location in said Visitor Location Register when certain events occur which make said data available in the system.

* * * * *